(12) United States Patent
Beard

(10) Patent No.: US 7,701,908 B1
(45) Date of Patent: Apr. 20, 2010

(54) MAPPING OF NON-ISOCHRONOUS AND ISOCHRONOUS CHANNELS

(75) Inventor: Paul Beard, Milpitas, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1188 days.

(21) Appl. No.: 10/949,093

(22) Filed: Sep. 23, 2004

Related U.S. Application Data

(60) Provisional application No. 60/506,220, filed on Sep. 25, 2003.

(51) Int. Cl.
    *H04W 4/00* (2006.01)
(52) U.S. Cl. .................. 370/333; 370/232; 370/252; 370/437
(58) Field of Classification Search ............... 370/329, 370/333, 332, 437, 229, 230, 232, 233, 234, 370/235, 252, 253, 431
See application file for complete search history.

(56) References Cited

U.S. PATENT DOCUMENTS

| | | | | |
|---|---|---|---|---|
| 5,521,904 A * | 5/1996 | Eriksson et al. | ............ | 370/249 |
| 5,809,059 A * | 9/1998 | Souissi et al. | ............ | 375/133 |
| 6,130,885 A * | 10/2000 | Izumi et al. | ............ | 370/343 |
| 6,965,590 B1 * | 11/2005 | Schmidl et al. | ............ | 370/343 |
| 7,079,516 B2 * | 7/2006 | You et al. | ............ | 370/337 |
| 7,095,719 B1 * | 8/2006 | Wilhelmsson et al. | ...... | 370/252 |
| 7,161,941 B1 * | 1/2007 | Schmidl et al. | ............ | 370/392 |
| 2004/0042410 A1 * | 3/2004 | Harris et al. | ............ | 370/252 |
| 2004/0072571 A1 * | 4/2004 | Halonen et al. | ............ | 455/450 |
| 2004/0131016 A1 * | 7/2004 | Hundal et al. | ............ | 370/252 |
| 2006/0114981 A1 * | 6/2006 | Ghosh et al. | ............ | 375/232 |

* cited by examiner

*Primary Examiner*—Ricky Ngo
*Assistant Examiner*—Wei-Po Kao

(57) ABSTRACT

A method of mapping channels in wireless communications is discussed. The method determines error rates on potential channels to be used in a frequency hopping communication system. The error rates and then used in mapping data to the channels such that isochronous data is mapped to channels having lower error rates than others of the potential channels.

17 Claims, 3 Drawing Sheets

MAPPING OF NON-ISOCHRONOUS AND ISOCHRONOUS CHANNELS

This patent application claims priority from U.S. Provisional Application Ser. No. 60/506,220 filed Sep. 25, 2003.

BACKGROUND

1. Technical Field

Embodiments of the present invention relate generally to electronic circuits and in particular to circuits for wireless communications.

2. Background

In wireless communication, the technique of frequency hopping is commonly used to 'spread' a signal over a spectrum range and reduce its susceptibility to noise or interference. Frequency hopping is one of two basic modulation techniques used in spread spectrum signal transmission, direct sequencing being the other. Frequency hopping is the repeated switching of frequencies during radio transmission and is often used to minimize the effectiveness of "electronic warfare", or the unauthorized interception or jamming of telecommunications. Frequency hopping also is known as frequency-hopping code division multiple access (FH-CDMA). Conventional wireless technologies including Bluetooth, Wireless USB, WiFi, etc. use the technique of frequency hopping to send signals. A channel in radio communications typically means a specific frequency or band of frequencies used to establish a communications path between two communication stations. In frequency hopping, each frequency to which the stations hop is a channel. A frequency hopping system changes channels generally according to a predetermined sequence known to the transmitter and receiver, for example. Each frequency to which the stations hop is a channel, usually within a defined band of channels.

FCC regulations say that all channels should be used equally, that there should be no low energy channels. However, in most applications not all channels have the same level of quality or reception. Poor channels, defined as those with high error rate frequently drop data and require information to be resent. This may be adequate for data that is not time-sensitive (non-isochronous) such as email or file transfer, etc. However, poor quality channels are generally not suitable for time-sensitive data (isochronous) such as voice, video, music and streaming media.

It would be desirable to have a method for mapping isochronous data to higher quality channels having lower error rates and mapping non-isochronous data to lower quality channels with higher error rates.

SUMMARY

An embodiment of the invention is a method of mapping channels in wireless communications. The method determines error rates on potential channels to be used in a frequency hopping communication system. The error rates and then used in mapping data to the channels such that isochronous data is mapped to channels having lower error rates than others of the potential channels.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
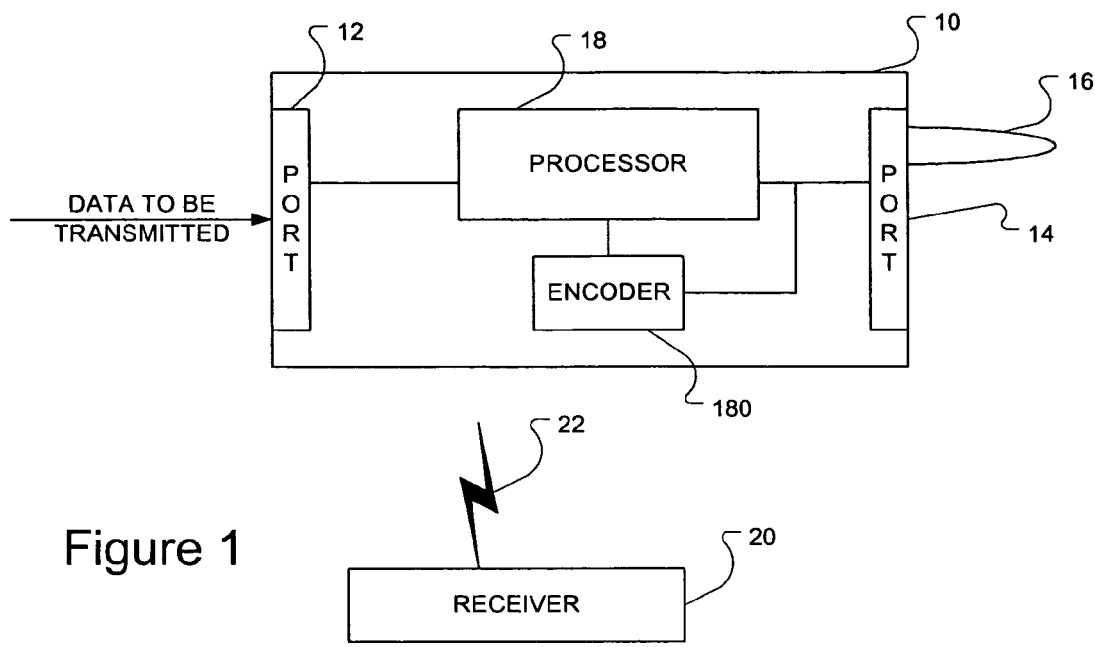
FIG. 1 shows a frequency hopping wireless system having a transmitter and a receiver.

An embodiment of a wireless system comprised of a transmitting endpoint 10 and a receiving endpoint 20 is shown in FIG. 1. It must be noted that the endpoints are more than likely transceivers, capable of transmitting and receiving data, and that the role of transmitter or receiver is only with regard to this one exemplary transaction. For ease of discussion and simplicity of the drawings, only the transmitter 10 is shown in detail, with the receiver 20 typically configured in a like fashion.

The transmitter 10 will generally have a first port 12 that allows it to receive data to be transmitted across a wireless link. A second port 14 allows the transmitter to pass data to the antenna 16 that allows wireless transmission. The ports 12 and 14 may be the same port, and the data to be transmitted could be received through the antenna as well. The two ports are only shown for ease of discussion.

A processor 18 directs overall operations of the transmitter 10. As will be discussed in more detail later, an encoder 180 may be a process running on the processor 18, or may reside in a separate circuit or chip from the processor. The encoder will allow the transmitter to perform forward error correction as directed by the processor 18. It must be noted that the processor 18 may be representative of a collection of processors, controllers or other devices that oversee the operation of the transmitter 10 and the use of the term 'processor' is not intended to imply a single entity.

The transmitter and receiver in this embodiment are communicating across a wireless link 22 in a frequency hopping scheme. In a frequency hopping scheme, the data being transmitted is spread across signals within a particular frequency band generally by short bursts sent on several different frequencies. These several different frequencies are generally referred to as channels. The amount of time, sometimes referred to as the 'dwell time,' and the sequences by the transmitter hops from channel to channel is generally known at both ends of the transmission. The receiver moves from channel to channel according to the predetermined sequence and receives data in concert with the transmissions.

It is possible to monitor the quality of the channels that are available in the frequency hopping scheme. Each channel is a potential channel for transmission in the frequency hopping scheme and may be referred to as a potential channel. Several measures of channel quality are available. A very common one is the bit error rate of the channel. The bit error rate measures how many bits have to be resent due to dropped or missed data. Other types of error measures may also be used.

Using some measure of channel quality, it is possible to ensure that when the transmitter is using the high quality channels, it transmits data that has higher quality requirements. As mentioned previously, data is generally isochronous, time-sensitive data, such as voice, video, music and other streaming media, or non-isochronous, such as e-mail, file transfer, etc. Using a combination of data identification and channel mapping, it is possible to map the isochronous data to the higher quality channels.

Figure 2:
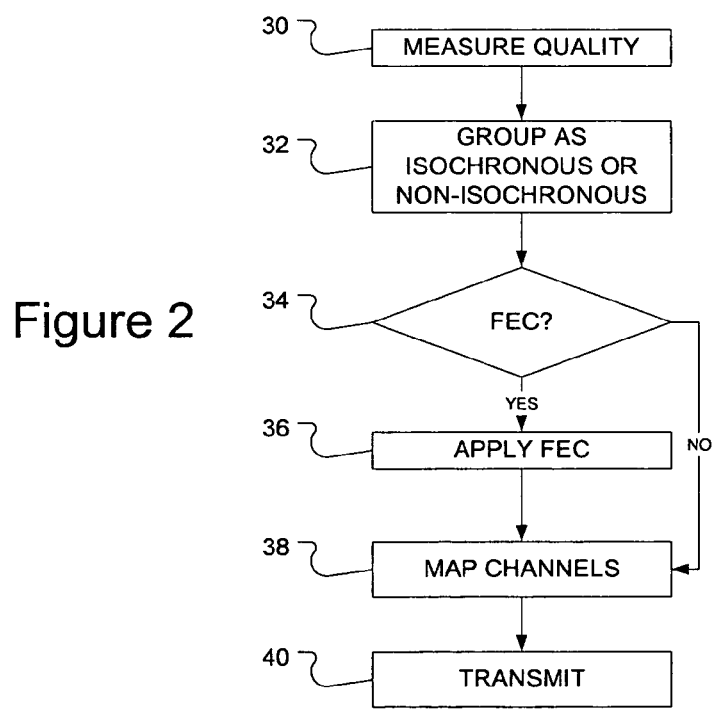
FIG. 2 shows a method of mapping channels in a frequency hopping system based upon channel quality and type of data to be transmitted.
Figure 3:
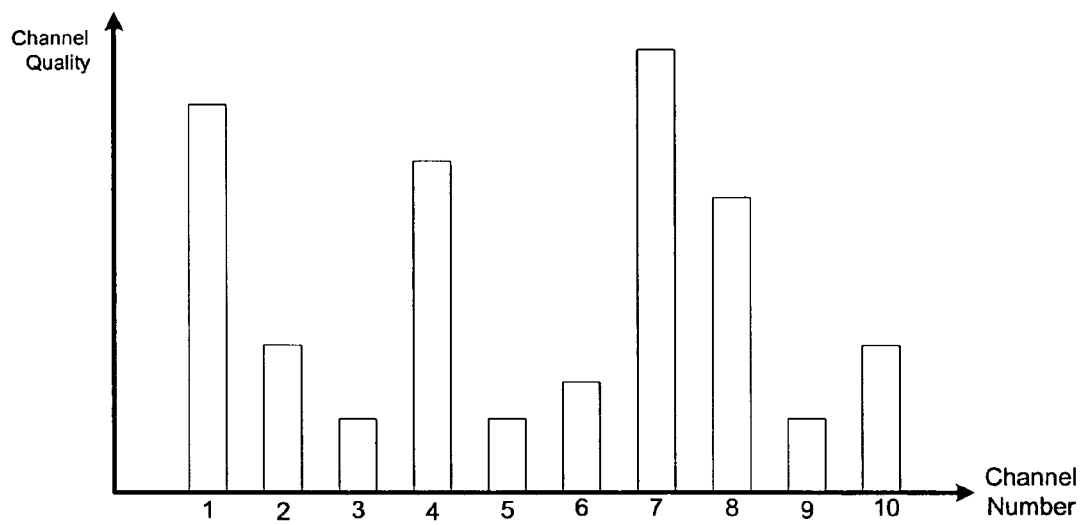
FIG. 3 shows a mapping of channels in a frequency hopping system showing channel quality.

An embodiment of a method for mapping isochronous data to higher quality channels and mapping non-isochronous data to lower quality channels is shown in FIG. 2. At 30, the error rate of each channel of a frequency hopping scheme is measured. An example of such a measurement is shown in FIG. 3. The channels may then be ranked in terms of error rate, with the channels having the lowest error rate considered high quality, and the channels having the highest error rate considered low quality.

At 32, the data to be sent across the channels is analyzed and grouped as isochronous or non-isochronous data. Analysis of the data may take one of many forms. For wireless systems in accordance with the Bluetooth standard, the packet may be analyzed by examining the 'packet type' field of the data to be transmitted. It must be understood that the term 'packet' as used here refers to any gathering of data into a discrete bundle of data to be transmitted, and may include frames, cells or other types of datagrams to be transmitted.

In wireless systems in accordance with the Institute of Electrical and Electronic Engineers standard 802.11a/b/g, for example, it is possible to examine the headers of the packets to determine if the data to be transmitted has certain properties, such as ordering. Ordering is generally required for streaming media, voice and video packets, as they cannot be 'played' out of order. Other fields in the packet headers may identify the data as 'real-time' data, or not explicitly as voice, video or streaming media, although that is possible as well. Further, the data of the packet payloads could be analyzed and based upon the data properties the packet could be classified as isochronous or non-isochronous.

Data packets may then be grouped according to the type of information they contain and whether it is isochronous or non-isochronous. Once the data packets are grouped, it is possible to determine if there is sufficient capacity on the high quality channels for all of the isochronous data. This may be a subprocess in the process of determining whether error correction should be applied to the data at 34. For example, if there is more isochronous data to be carried than high quality channels available to service it, it may be necessary to send some of the isochronous data on poorer quality channels. To help reduce the error rate of the poorer channels, forward error correction (FEC) techniques may be used.

Generally, forward error correction generally involves transmitting data and adding bits to the characters or code blocks according to a predetermined algorithm. The receiver can then use the extra bits to check for errors and correct them at the other end.

Forward error correction techniques that are widely used and are suitable for this application included Viterbi encoding and decoding, Reed-Solomon encoding and decoding, Hamming encoding and decoding, and interleaving and deinterleaving schemes. Viterbi, Reed-Solomon and Hamming encoding techniques provide different methods of adding bits to the data to be transmitted that allow the receiver to error check and correct, as needed.

Data interleaving techniques spread data over a variable period of time in order to combat adjacent burst errors. Some forward error correction encoders cannot handle burst errors by themselves. Standing alone, data interleaving can spread burst errors across several packets, reducing the number of errors per packet. When combined with forward error correction techniques, the distribution of burst errors results in fewer errors to correct per packet, making the forward error correction techniques more effective.

In an embodiment where an encoding technique may be used, data to be transmitted is passed through an encoder implementing a particular encoding algorithm as discussed above on the transmit side, and then transmitted over the air. On the receive side the data is received and passed through a similarly-configured decoder to obtain the original transmitted data.

A user may select from a plurality of these techniques, or combine them in a plurality of ways together to obtain different levels of forward error correction. The choice of techniques selected may be determined by the error level of the channel on which the data is to be transmitted, on the priority and nature of the data to be carried, and other factors. For example, the system could be preset with a particular channel quality measure and if no channels meet that requirement forward error correction could be enacted immediately.

The use of forward error correction may be limited to those situations when the amount of isochronous data exceeds the capacity on the higher channels, or may be used regardless of capacity. If the decision to apply forward error correction is made at 34, it is applied at 36. Otherwise, the process moves to mapping channels at 38.

Figure 4:
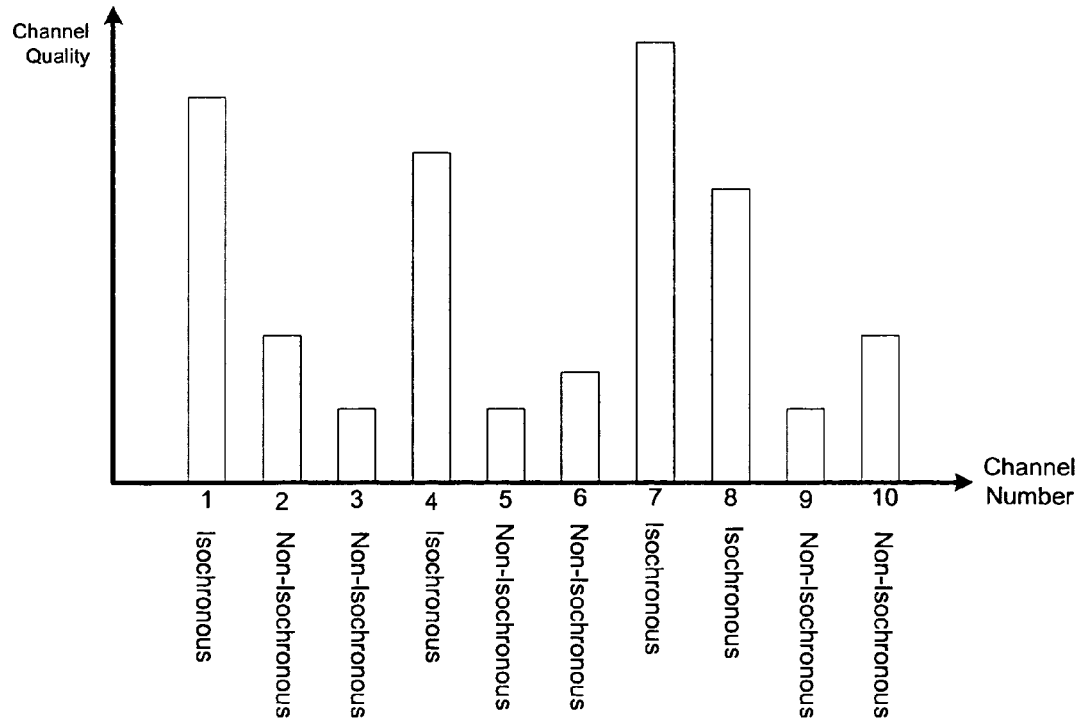
FIG. 4 shows a mapping of channels in a frequency hopping system based upon bit error rates.

FIG. 4 shows an example of channel mapping according to the quality analysis performed in FIG. 3. In FIG. 4, no forward error correction is applied, resulting in the higher quality channels being mapped with isochronous data, such as channel 1 and 4. The lower quality channels are used for non-isochronous data, such as channels 3 and 5. These are just examples and are intended to demonstrate possible channel mappings.

Figure 5:
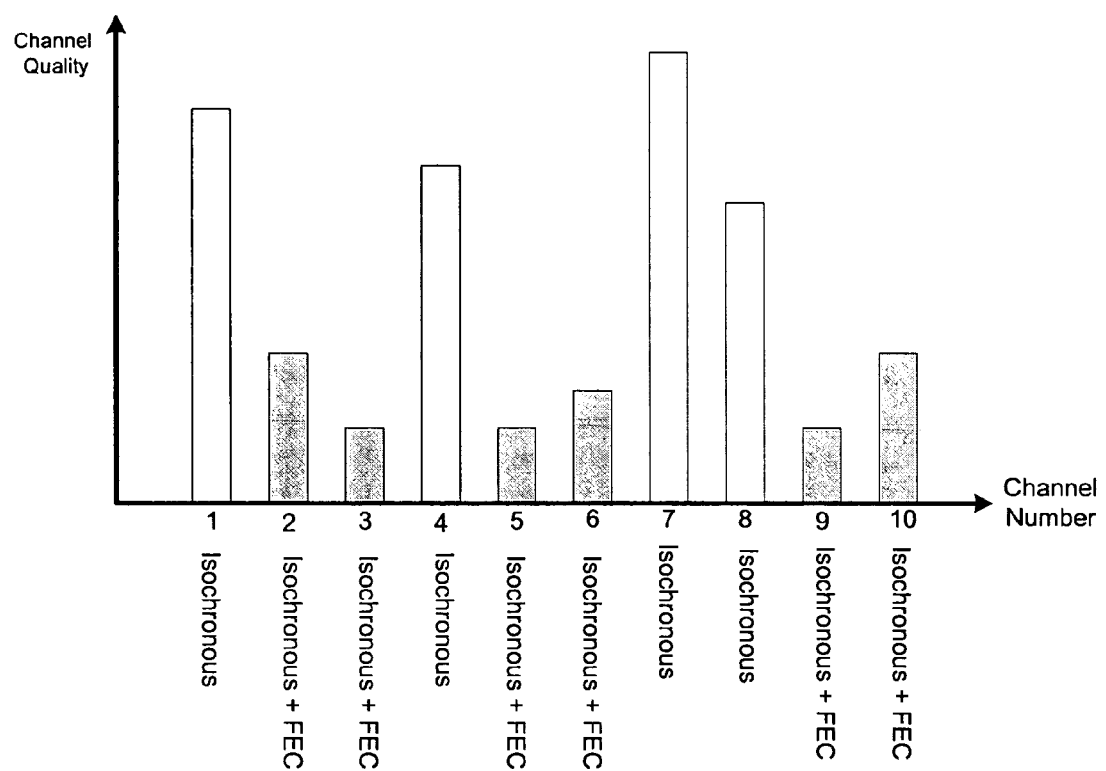
FIG. 5 shows a mapping of channels in a frequency hopping system based upon bit error rates and forward error correction.

If forward error correction is applied, as discussed with regard to FIG. 2, the isochronous data may be applied to the lower quality channels. As mentioned previously, this may be due to the isochronous data exceeding the high quality channel capacity. If forward error correction is applied, lower quality channels may be employed for isochronous data. This is shown in FIG. 5, with the channels designated with hash marks being those that are lower quality channels with forward error correction employed.

For example, channels 2 and 3 had previously been marked as lower quality channels, and therefore would not normally be used for isochronous data. With the employment of forward error correction techniques, all of the available channels could be used for isochronous data. It must be noted that all channels are not required to be used for isochronous data. In this particular example, there is enough isochronous data to use all channels, but it is possible that some channels may be used for non-isochronous data.

Once the channels are mapped according to whichever technique employed, the data is transmitted on those channels at 40. As the transmitter hops from channel to channel, it will transmit the appropriate data on the appropriate channel. In addition, the quality rating may be updated at intervals determined by the system, the user or a combination of both.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects.

This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method of mapping channels in wireless communications, comprising:
   determining by a transmitter bit error rates on potential channels to be used in a frequency hopping communication system;
   determining by a transmitter if data to be transmitted is isochronous data or non-isochronous data;
   determining by a transmitter whether an amount of the isochronous data exceeds a capacity of high quality channels having lower bit error rates than others of the potential channels;
   mapping by a transmitter data to the channels such that the isochronous data is mapped to the high quality channels having lower bit error rates than others of the potential channels;
   mapping by a transmitter data to the channels such that the non-isochronous data is mapped to the low quality channels having higher bit error rates than others of the potential channels; and
   if the amount of the isochronous data exceeds the capacity, applying by a transmitter forward error correction to a portion of the isochronous data and mapping the portion of the isochronous data to channels having higher bit error rates than others of the potential channels.

2. The method of claim 1, further comprising transmitting by a transmitter data on the channels in the communication system.

3. The method of claim 1, mapping data to the channels further comprising mapping by a transmitter non-isochronous data to channels having higher bit error rates.

4. The method of claim 1, determining by a transmitter bit error rates further comprising ranking the channels in terms of bit error rate.

5. The method of claim 1, applying forward error correction further comprising applying by a transmitter encoding selected from the group comprised of: Reed-Solomon, Viterbi, Hamming, and interleaving.

6. The method of claim 1, applying forward error correction further comprising applying by a transmitter at least two encoding schemes selected from the group comprised of: Reed-Solomon, Viterbi, Hamming, and interleaving.

7. A communications system, comprising:
   a transmitter to map isochronous data to high quality channels having low bit error rates in relation to other channels and to transmit the data, the transmitter further to determine whether an amount of isochronous data exceeds the capacity of the high quality channels and, if the amount of isochronous data exceeds the capacity, apply forward error correction to a portion of the isochronous data and map the portion of the isochronous data to low quality channels having high bit error rates in relation to other channels; and
   a receiver to receive the data on the channels having low bit error rates and high bit error rates.

8. The system of claim 7, the transmitter further comprising an encoder.

9. The system of claim 8, the transmitter further comprising an encoder selected from the group comprised of: a Reed-Solomon encoder, a Viterbi encoder, a Hamming encoder, and an interleaving encoder.

10. The system of claim 7, the receiver further comprising a decoder.

11. The system of claim 10, the decoder further comprising a decoder selected from the group comprised of: a Reed-Solomon decoder, a Viterbi decoder, a Hamming decoder, and a de-interleaving decoder.

12. A method of mapping channels in a frequency hopping communication method, comprising:
   determining by a transmitter a bit error correction rate for potential channels in the frequency hopping method;
   determining by a transmitter if data to be transmitted is isochronous data or non-isochronous data;
   determining by a transmitter whether an amount of isochronous data exceeds a capacity of channels having lower bit error correction rates than others of the potential channels;
   if the data is isochronous data, transmitting the data by a transmitter on high quality channels having lower bit error correction rates than others of the potential channels;
   if the data is non-isochronous data, transmitting the data by a transmitter on low quality channels having higher bit error correction rates than others of the potential channels; and
   if the amount of isochronous data exceeds the capacity, performing forward error correction by a transmitter on a portion of the isochronous data and transmitting the portion of the data by a transmitter on low quality channels having higher bit error correction rates than others of the potential channels.

13. The method of claim 12, the method further comprising ranking by a transmitter the potential channels by bit error correction rates.

14. The method of claim 12, performing forward error correction further comprising encoding the data by a transmitter using one from the group comprised of: Reed Solomon encoding, Hamming encoding, Viterbi encoding, and data interleaving.

15. The method of claim 12, determining by a transmitter if the data is isochronous or non-isochronous further comprises examining a 'packet type' field of the data to be transmitted according to the Bluetooth standard.

16. The method of claim 12, determining by a transmitter if the data is isochronous or non-isochronous further comprising examining a packet header in accordance with the Institute of Electrical and Electronic Engineers standard 802.11.

17. The method of claim 12, determining by a transmitter if the data is isochronous or non-isochronous further comprising examining properties of the packet payloads.

* * * * *